US009997995B2

(12) United States Patent
Humphrey et al.

(10) Patent No.: US 9,997,995 B2
(45) Date of Patent: Jun. 12, 2018

(54) THREE-PHASE PARALLEL POWER CONVERTER LOAD ADJUSTMENT

(71) Applicant: HEWLETT-PACKARD ENTERPRISE DEVELOPMENT LP, Houston, TX (US)

(72) Inventors: Daniel Humphrey, Cypress, TX (US); Mohamed Amin Bemat, Cypress, TX (US)

(73) Assignee: HEWLETT-PACKARD ENTERPRISE DEVELOPMENT LP, Houston, TX (US)

( * ) Notice: Subject to any disclaimer, the term of this patent is extended or adjusted under 35 U.S.C. 154(b) by 391 days.

(21) Appl. No.: 14/764,571

(22) PCT Filed: Feb. 28, 2013

(86) PCT No.: PCT/US2013/028251
§ 371 (c)(1),
(2) Date: Jul. 29, 2015

(87) PCT Pub. No.: WO2014/133521
PCT Pub. Date: Sep. 4, 2014

(65) Prior Publication Data
US 2015/0364990 A1 Dec. 17, 2015

(51) Int. Cl.
*H02M 1/42* (2007.01)
*H02M 7/04* (2006.01)
*H02J 3/46* (2006.01)
*H02J 1/14* (2006.01)

(52) U.S. Cl.
CPC ............ *H02M 1/4216* (2013.01); *H02J 1/14* (2013.01); *H02J 3/46* (2013.01); *H02M 7/04* (2013.01); *Y10T 307/406* (2015.04)

(58) Field of Classification Search
CPC .......... H02M 1/4216; H02M 7/04; H02J 1/14; H02J 3/46; Y10T 307/406
USPC .......................................................... 307/31
See application file for complete search history.

(56) References Cited

U.S. PATENT DOCUMENTS

| 5,148,361 A | 9/1992 | Braun et al. |
| 6,215,290 B1 | 4/2001 | Yang |
| 2004/0061380 A1 | 4/2004 | Hann |
| 2009/0146621 A1 | 6/2009 | Tang |
| 2009/0189456 A1 | 7/2009 | Skutt |
| 2011/0013348 A1 | 1/2011 | Siebold |

FOREIGN PATENT DOCUMENTS

| CN | 101237194 A | 8/2008 |
| CN | 101416376 A | 4/2009 |
| CN | 1023955938 A | 3/2012 |

(Continued)

OTHER PUBLICATIONS

ISA/KR, International Search Report, dated Nov. 26, 2013, PCT/US2013/028251, filed Feb. 28, 2013.

(Continued)

*Primary Examiner* — Hal Kaplan
(74) *Attorney, Agent, or Firm* — Hewlett Packard Enterprise Patent Department

(57) ABSTRACT

A sharing criteria metric is received for each of three phases of a three-phase power. Loads on power converters receiving the three phase power are adjusted based on the sharing criteria metric of each of the three phases.

15 Claims, 3 Drawing Sheets

(56) References Cited

FOREIGN PATENT DOCUMENTS

TW           I347737       8/2011
TW           M428404 U1   5/2012

OTHER PUBLICATIONS

C.J.John Joseph, A Novel Thermal Based Current Sharing Control of Parallel Converters, 26th Annual International Telecommunications Energy Conference, Sep. 19-23, 2004, 7 pps.
Extended European Search Report received in EP Application No. 13876588.8, dated Oct. 11, 2016, 7 pages.

THREE-PHASE PARALLEL POWER CONVERTER LOAD ADJUSTMENT

BACKGROUND

Three phase power management systems sometimes employ parallel power converters that transmit three-phase power to different power consuming devices. Such three phase power management systems may be subject to reliability issues.

DETAILED DESCRIPTION OF THE EXAMPLE IMPLEMENTATIONS

Figure 1:
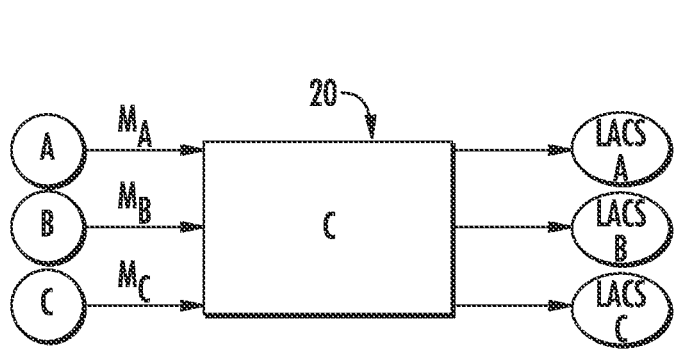
FIG. 1 is a schematic illustration of an example three-phase parallel power converter load adjustment controller.

FIG. 1 schematically illustrates an example three-phase parallel power converter load adjustment controller 20. As will be described hereafter, actively and intelligently manages load sharing between parallel single phase power converters. Controller 20 adjusts the individual loads of single phase parallel power converters to enhance reliability.

Controller 20 comprises one or more processing units to actively manage load sharing between power converters. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other implementations, controller 20 may comprise hard wired circuitry that may be used in place of or in combination with software instructions to implement the functions described. For example, controller 20 may be embodied as part of one or more application-specific integrated circuits (ASICs). Unless otherwise specifically noted, a "controller" is not limited to any specific combination of hardware circuitry and software, nor to any particular source for the instructions executed by the processing unit.

As schematically represented on the left side of controller 20, controller 20 receives a load sharing criteria metric M for each of the three phases A, B, C of a three-phase power infrastructure. In one implementation, the three phases are A to neutral, B to neutral, and C to neutral (a wye power configuration). In another implementation, three phases are A to B, B to C, and C to A (a delta power configuration). The sharing criteria metric M that is received for each of the three phases indicates the present electrical current on the particular phase. In one implementation, the metric M received by controller 20 is a direct measurement of the electrical current itself. For example, in one implementation, controller 20 receives signals from a current transformer associated with each phase the directly senses electrical current for each of the three phases. In another implementation, the metric M received by controller 20 is an indirect measurement of the electrical current. For example, one implementation, controller 20 receives signals from a sensor indicating a temperature for each of the three phases, wherein the temperature indirectly indicates the flow of electrical current. Examples of sensors for sensing temperature comprise thermocouples and resistive temperature detectors or thermistors such as positive temperature coefficient (PTC) thermistors (posistors) and negative temperature coefficient (NTC) thermistors.

The location at which the load sharing criteria metric for each of the three electrical phases is obtained lies between the source of the three-phase electric power and the output of power converters. In one implementation, the load sharing criteria metric received by controller 20 are sensed at outputs of a power distribution unit with supply power to each of the parallel power converters. In another implementation, the load sharing criteria metric received by controller 20 are sensed at outputs of other three-phase devices such as a transformer, a generator, a circuit breaker or an uninterrupted power supply (UPS) or battery backup. In still other implementations, the load sharing criteria metric received by controller 20 are sensed at outputs of other electrical devices between the source of the three-phase power and the output of the parallel power converters. As will be described hereafter, in some implementations, controller 20 receives load sharing criteria metrics for each of the three electrical phases at different stages between the three-phase power source and the output of the parallel power converters, such as the outputs of a power distribution unit as well as the outputs of an upstream transformer or UPS.

As schematically indicated on the right side of controller 20, based upon the received load sharing criteria metrics and the relationship between the load sharing criteria metrics to one another or to a predefined criteria, controller 20 generates and outputs load adjusting control signals (LACS) for each of the three electrical phases. The load adjustment control signals for each of three phases are transmitted to the parallel single phase power converters. For purposes of this disclosure, a single phase power converter is a power converter that converts electrical power received from one or two phases, either line to neutral (a single phase) or line to line (two phases), of a three-phase power supply.

The load adjustment control signals adjust the electrical load for at least one of the parallel power converters to better satisfy load sharing objectives. In one implementation, load adjusting control signals generated by controller 20 adjust loads on the parallel single phase power converters to enhance a degree of electrical current balance across the three electrical phases across the parallel single phase power converters. In another implementation, load adjusting control signals generated by controller 20 adjust loads on the parallel single phase power converters when the received sharing criteria metrics for one of the three phases exceeds a predetermined threshold indicating a potentially harmful situation. In one implementation, load adjusting control signals generated by controller 20 provide different levels of load adjustment for the single phase power converters depending upon which of multiple sharing criteria thresholds is satisfied. For example, controller 20 may provide a first degree of load adjustment when a first criteria threshold is satisfied, a second different greater degree of load adjustment when a second sharing criteria threshold is satisfied and a third even greater degree of load adjustment when a third sharing criteria threshold is satisfied.

The load adjustment control signals adjust the load on the single phase power converters by increasing the output voltage of the single phase power converters to increase a load or decreasing output voltage of the single phase power converter to decrease a load. For example, in implementations where the objective is to enhance electrical current balance across the three phases, controller 20, in response to receiving sharing criteria metrics indicating that phase A is overloaded, generates load adjustment control signals decreasing the output voltage, and the corresponding load, of those power converters connected to phase A. Alternatively, in response to receiving sharing criteria metrics indicating that phase A is overloaded, controller 20 generates load adjustment control signals increasing output voltage, and the corresponding load, of those single phase power converters connected to phases B and C. In yet other implementations, to enhance electrical current balance across three phases, controller 20, in response to receiving sharing criteria metrics indicating that phase A is overloaded, may generate load adjustment signals increasing output voltage, and the corresponding load, of those single phase power converters connected to phases B and C while also generating load adjustment signals decreasing output voltage, and the corresponding load, of those single phase power converters connected to phase A. Similar adjustments may be made when the received sharing criteria metrics indicate that other phases are overloaded or indicating that the three electrical phases are not within a predetermined range of one another or do not have a predetermined degree of balance.

Figure 2:
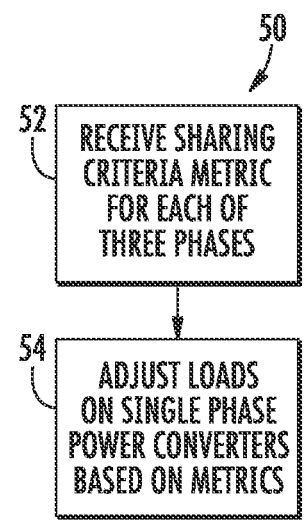
FIG. 2 is a flow diagram of an example method that may be carried out by the controller of FIG. 1.

FIG. 2 is a flow diagram illustrating an example method 50 for managing load sharing between parallel single phase power converters. As indicated by step 52, controller 20 receives a sharing criteria metric for each of three phases of a three-phase power infrastructure. The sharing criteria metric M that is received for each of the three phases indicates the present electrical current on the particular phase. In one implementation, the metric M received by controller 20 is a direct measurement of the electrical current itself. In another implementation, the metric M received by controller 20 is an indirect measurement of the electrical current. In one implementation, the load sharing criteria metric received by controller 20 are sensed at outputs of a power distribution unit which supplies power to each of the parallel power converters. In another implementation, the load sharing criteria metric received by controller 20 are sensed at outputs of a transformer or at outputs of an uninterrupted power supply (UPS) or battery backup. In still other implementations, the load sharing criteria metric received by controller 20 are sensed at outputs of other electrical devices between the source of the three-phase power and the output of the parallel power converters.

As indicated by step 54, controller 20 adjusts loads on the single phase power converters based upon the received sharing criteria metrics. Controller 20 adjusts the electrical load for at least one of the parallel power converters to better satisfy load sharing objectives. In one implementation, controller 20 adjusts loads on the parallel single phase power converters to enhance a degree of electrical current balance across the three electrical phases across the parallel single phase power converters. In another implementation, controller 20 adjusts loads on the parallel single phase power converters when the received sharing criteria metrics for one of the three phases exceeds a predetermined threshold indicating a potentially harmful situation. In one implementation, controller 20 provides different levels of load adjustment for the single phase power converters depending upon which of multiple sharing criteria thresholds is satisfied. For example, controller 20 may provide a first degree of load adjustment when a first criteria threshold is satisfied, a second different greater degree of load adjustment when a second sharing criteria threshold is satisfied and a third even greater degree of load adjustment when a third sharing criteria threshold is satisfied.

Figure 3:
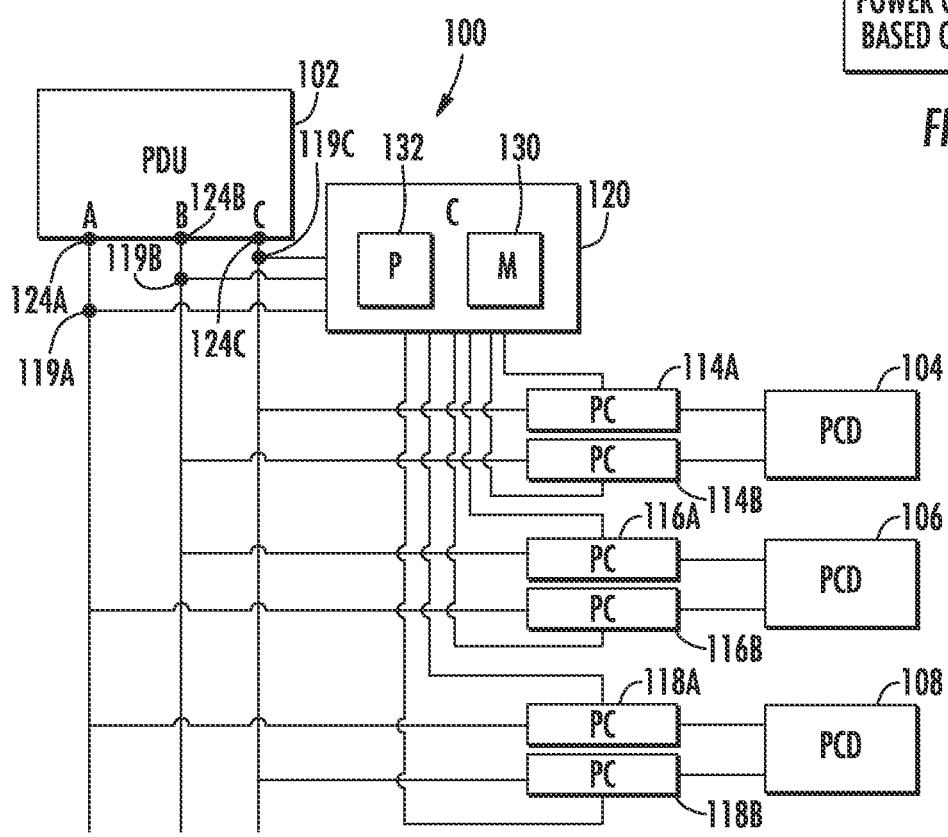
FIG. 3 is a schematic illustration of an example three-phase power management system.

FIG. 3 schematically illustrates an example three phase power management system 100 incorporating controller 120, an example implementation of controller 20. Three phase power management system 100 comprises power distribution unit 102, power consuming devices 104, 106 and 108, single phase power converters 114A, 114B, 116A, 116B, 118A and 118B, phase metric sensors 119A. 119B and 119C (collectively referred to as phase metric sensors 119) and controller 120. Power distribution unit 102 comprises a three-phase device having multiple outputs to distribute electrical power for the three electrical phases. In one implementation, power distribution unit 102 transforms one or more larger capacity raw power feeds into a number of lower capacity distributed power feeds. In one implementation, power distribution unit 102 comprises a smart PDU, a rack base PDU, and intelligent PDU or a "power strip". Power distribution unit 102 comprises power outlets 124A associated with the A phase, power outlet 124B associated with the B phase and power outlet 124C associated with the C phase. Example of outlets 124A, 124B and 124C include, but are not limited to, IEC-C19, IEC-C13 or NEMA5-20 style outlets, wherein IEC stands for International Electrotechnical Commission and NEMA stands for National Electrical Manufacturers Association.

Power consuming devices 104, 106 and 108 comprise devices which consume electrical power. In one implementation in which three phase power management system 100 comprises a rack, power consuming devices 104, 106, 108 comprise information technology devices such as servers, networking devices, and storage devices. Each of power consuming devices 104, 106, 108 receives electrical power from at least two parallel single phase power converters. In the example illustrated, power consuming device 104 receives electrical power from parallel single phase power converters 114A and 114B. Power consuming device 106 receives electrical power from parallel single phase power converters 116A and 116B. Power consuming device 108 receives electrical power from parallel single phase power converters 118A and 118B. In some implementations, the parallel single phase power converters are incorporated into the associated power consuming devices. For example, a server may incorporate built-in parallel single phase power converters.

Power converters 114A, 114B, 116A, 116B, 118A, 118B comprise single phase power converters that convert electrical power received from power distribution unit 102 for use by power consuming devices 104, 106 and 108. In one implementation, power converters 114A, 114B, 116A, 116B, 118A, 118B convert alternating current to direct current. Each of power converters 114A, 1141, 116A, 116B, 118A, 118B further adjusts the electrical power received from power distribution unit 102 for use by power consuming devices 104, 106 and 108. In one implementation, each of power converters 114A, 114B, 116A, 116B, 118A, 118B comprises one of a different or distinct series of power converters, wherein adjustment of load on one of the series of power converters adjusts a load on each of the series of power converters. In one implementation, each of power converters 114A, 114B, 116A, 116B, 118A, 118B is connected to controller 120 such that controller 120 may adjust load of the individual power converter.

Although three phase power management system 100 is illustrated as including three power consuming devices 104, 106, 108 with each power consuming device receiving power from a pair of parallel power converters, in other implementations, each power consuming device may receive power from greater than two parallel power converters. In other implementations, three phase power management system 100 may comprise greater than three power consuming devices and associated pairs of parallel power converters (or more than two power converters for each power consuming device). As will be described hereafter with respect to FIG. 5, in some implementations, some of the power consuming devices and the associated power supplying parallel single phase power converters may not be adjustable by controller 120.

Phase metric sensors 119 detect sharing criteria metrics for each of the three phases being output by power distribution unit 102. Sensors 119A, 119B and 119C detect sharing criteria metric for phases A. B and C, respectively. In one implementation where sensors 119 directly detect an electrical current for each of the three phases, sensors 119 comprise current transformers. In other implementations other current detecting or sensing devices may be utilized for sensors 119. In other implementations where sensors 119 indirectly detect an electrical current for each of the three phases, such as by detecting a temperature, each of sensors 119 comprise a temperature sensing device such as a thermocouple or a thermistor. In yet other implementations, sensors 119 may comprise other devices to sense other metrics that indirectly indicate current on each of the three phases.

Controller 120 is similar to controller 20 described above in that controller 120 comprises one or more processing units to actively manage load sharing between power converters 114A, 114B, 116A, 116B, 118A, 118B, Controller 120 comprises memory 130 and processing unit 132. Memory 130 comprises a non-transient computer-readable medium or persistent storage device containing code or instructions for directing the operation of processing unit 132. In one implementation, memory 130 stores threshold values for use in managing load sharing amongst power converters. Memory 130 further stores code or instruction for directing processing unit 132 two obtain or receive sharing criteria metrics for each of the three phases from sensors 119 and to adjust loads on the single phase power converters based upon the received sharing criteria metrics.

Processing unit 132 follows instructions contained in memory 130. In one implementation, processing unit 132, following instructions contained in memory 130, compares sharing criteria metrics received from sensors 119 to stored thresholds when determining how to adjust loads on the single phase power converters. In another implementation, processing unit 132, following instructions contained in memory 130, compares sharing criteria metrics received from sensors 119 to one another as part of determining how to adjust loads on the single phase power converters.

Figure 4:
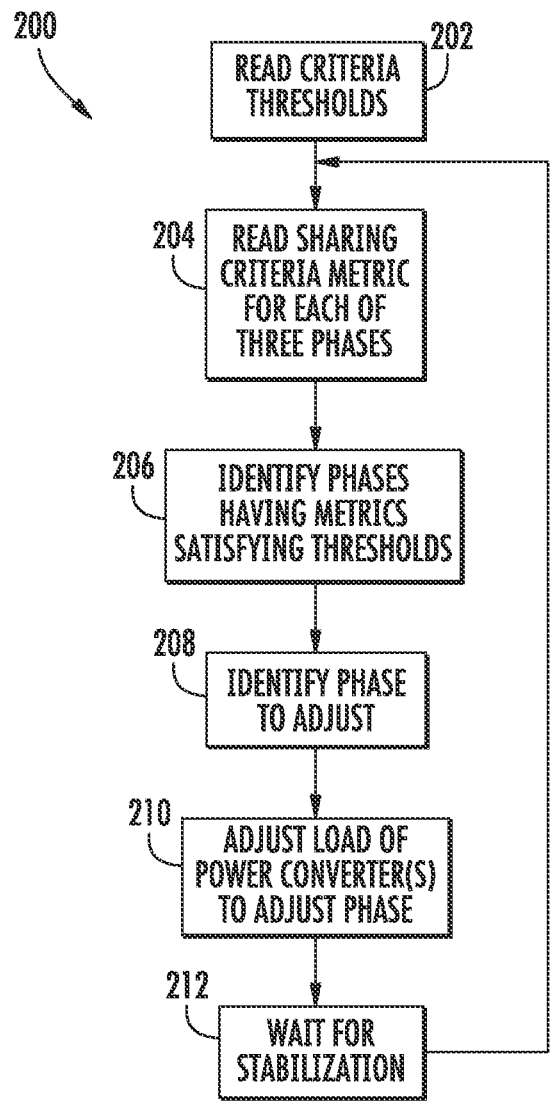
FIG. 4 is a flow diagram of an example method that may be carried out by the system of FIG. 3.

FIG. 4 is a flow diagram illustrating an example method 200 carried out by processing unit 132 following instructions contained in memory 130 when managing loads on power converters 114A, 114B, 116A, 116B, 118A, 118B. As indicated by step 202, processing unit 132 reads criteria thresholds stored in memory 130. In some implementations, processing unit 132 or retrieve such thresholds from a memory remote from processing unit 132 such as across a local area network or a wide area network. In one implementation, the criteria thresholds comprise phase current difference thresholds, the difference in electrical current between phases at which different levels or degrees of load adjustment of the power converters may be triggered.

As indicated by block or step 204, processing unit 132, following instructions contained in memory 130, reads a sharing criteria metric for each of the three phases. In one implementation, the sharing criteria metric may comprise electrical current as detected by sensors such as a current transformer. In another implementation, the sharing criteria metric may comprise a metric indirectly indicating electrical current, such as temperature, as detected by a temperature sensor such as a thermocouple or thermistor.

As indicated by step 206, processing unit 132, following instructions provided by memory 130, identifies those phases having metrics satisfying the criteria thresholds. Processing unit 132 compares the received sharing criteria metrics to the criteria thresholds for each of the phases. Those phases having criteria metrics that satisfy the criteria thresholds are candidates for electrical current adjustment by controller 120.

As indicated by step 208, processing unit 132, following instructions provided by memory 130, identifies which of the three phases to adjust. In one implementation, processing unit 132 selects for adjustment the phase having a sharing criteria metric exceeding the criteria threshold by the greatest extent.

As indicated by step 210, processing unit 132, following instructions provide by memory 130, adjusts the load of those power converters that are connected to the identified phase selected for adjustment. For example, processing unit 132 may generate load adjustment control signals which are transmitted to those single phase power converters receiving power from the phase identified in step 208. The load adjustment signals may decrease the output voltage of those single phase power converters to decrease their load and reduce electrical current flow in the selected phase. Loads across those single phase power converters connected to the other two phases are increased.

As indicated by step 212, after such load adjustment in step 210, processing unit 132 waits for stabilization prior to returning to step 204. Following instructions contained in memory 102, processing unit 132 delays return to step 204 for a predetermined period of time before once again reading sharing criteria metrics for each of the three phases. In other implementations, controller 120 may manage and adjust electrical current across each of the three phases utilizing other methods or management processes.

Figure 5:
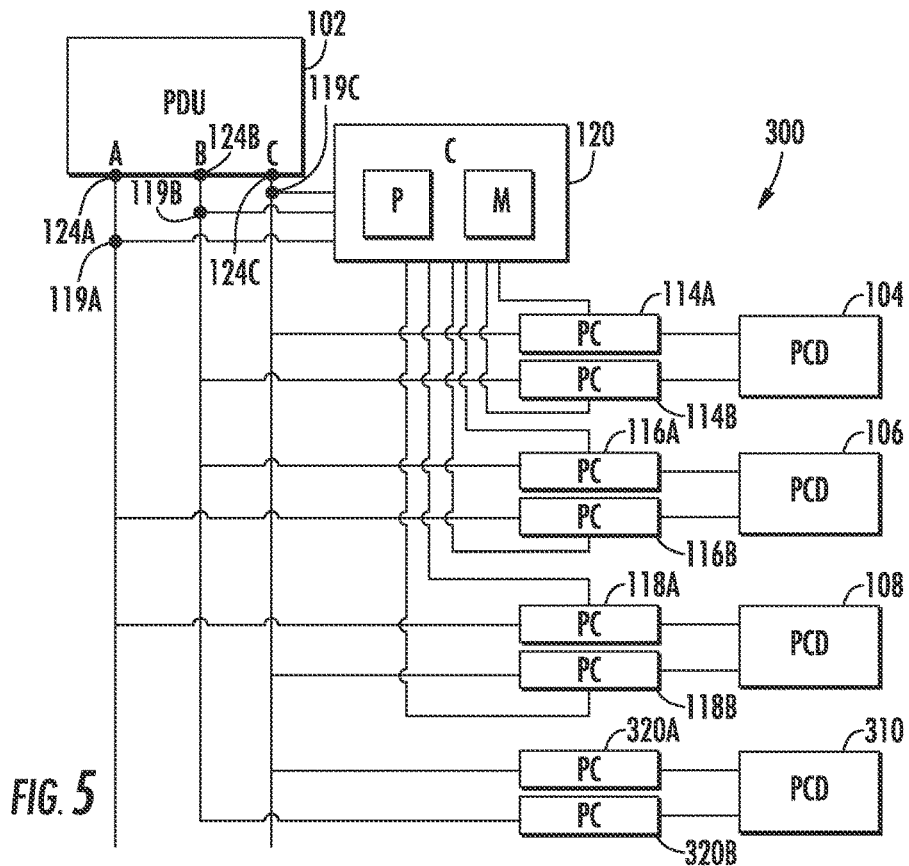
FIG. 5 is a schematic illustration of another example three-phase power management system.

FIG. 5 schematically illustrates three phase power management system 300, an example implementation of three phase power management system 100. Three phase power management system 300 is similar to three phase power management system 100 except that three phase power management system 300 additionally comprises power consuming device 310 and power converters 320A, 320B. Those remaining components of three phase power management system 300 which correspond to components of three phase power management system 100 are numbered similarly. Power consuming device 310 receives electrical power from power converter 320A and 320B. Power converter 320A and 320B supply power to power consuming device 310 in parallel, but are not adjustable by controller 120. In other words, power converter 320A and 320B are not in communication with controller 120 so as to receive load adjustment control signals to manage electrical current across the three electrical phases.

Despite power converter 320A, 320B not having load which are adjustable by controller 120, controller 120 may still manage electrical current across the electrical phases supplying power to power consuming device 310 through power converter 320A. 320B. In the example illustrated, power converter 320A receives power from phase C. In circumstances where electrical current across phase C exceeds a predetermined threshold, controller 120 may lower the electrical current across phase C being supplied to power converter 320A by increasing the output voltages and corresponding loads for those power converters that are receiving power from the other phases, phases A and B, and that are adjustable by controller 120. Similarly, in circumstances where electrical current across phase B exceeds a predetermined threshold, controller 120 may lower the electrical current across phase B being supplied to power converter 320B by increasing the output voltages and corresponding loads for those power converters that are receiving power from the other phases, phases A and C, and that are adjustable by controller 120.

Figure 6:
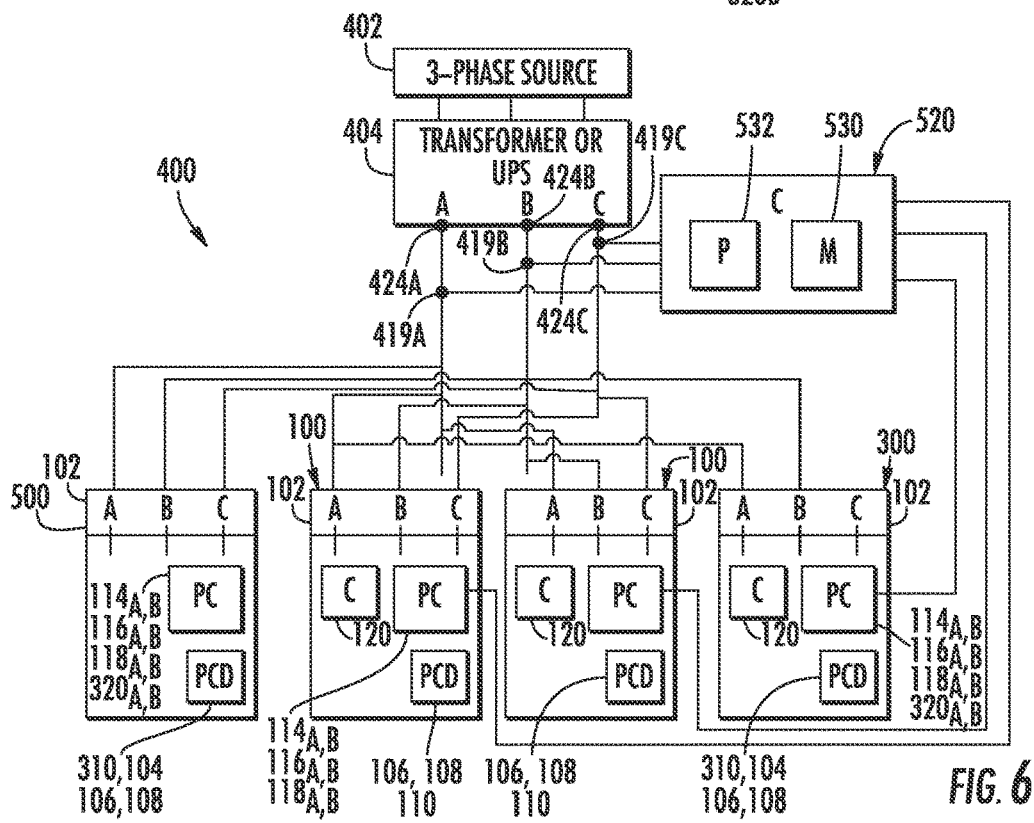
FIG. 6 is a schematic illustration of yet another example three-phase power management system.

FIG. 6 schematically illustrates three phase power management system 400, an example of managing electrical currents across different electrical phases based upon sharing criteria metrics from different stages or levels of a three-phase power infrastructure. System 400 comprises three-phase power management systems 100 and 300, three-phase power system 500, three-phase power source 402, intermediate three-phase power conversion device 404, sharing criteria metrics sensors 419A, 419B and 419C (collectively referred to as sharing criteria metrics sensors 419) and controller 520. Three-phase power management systems 100 and 300 are described above. Three-phase power system 500 is similar to three-phase power management system 300 in that three-phase power system 500 comprises power distribution unit 102, power consuming devices 106, 108, 110, 310 and power converters 114A, 114B, 116A, 116B, 118A, 118B, 120A, 120B. Three-phase power system 500 omits controller 120 for managing electrical current loads across the three electrical phases based upon the output characteristics of power distribution unit 102.

Three-phase power source 402 comprises a three-phase utility feed supplying three-phase electric power. Intermediate three-phase power conversion device 404 receives three-phase power from source 402 and convert such power prior to transmitting such power to each of power distribution units 102. In the example illustrated, device 404 comprises a transformer or an uninterrupted power supply such as a battery backup. Device 404 comprises electrical outlets 424A, 424B and 424C for the phases A, B, and C, respectively.

Sharing criteria metrics sensors 419 detect sharing criteria metrics for each of the three phases being output by intermediate power conversion device 404. Sensors 119A, 119B and 119C detect sharing criteria metric for phases A, B and C, respectively. In one implementation where sensors 119 directly detect an electrical current for each of the three phases, sensors 119 comprise current transformers. In other implementations other current detecting or sensing devices may be utilized for sensors 119. In other implementations where sensors 119 indirectly detect an electrical current for each of the three phases, such as by detecting a temperature, each of sensors 119 comprise a temperature sensing device such as a thermocouple or a thermistor. In yet other implementations, sensors 119 may comprise other devices to sense other metrics that indirectly indicate current on each of the three phases.

Controller 520 is similar to controller 20 described above in that controller 120 comprises one or more processing units to actively manage load sharing between power converters 114A, 114B, 116A, 116B, 118A, 118B. Controller 520 is similar to controller 120 except the controller 520 manages electrical current for the three phases at a transformer or uninterrupted power supply stage across a plurality of power distribution units 102. Controller 520 comprises memory 530 and processing unit 532. Memory 530 comprises a non-transient computer-readable medium or persistent storage device containing code or instructions for directing the operation of processing unit 532. In one implementation, memory 530 stores threshold values for use in managing load sharing amongst power converters based upon sharing criteria metrics received from sensors 419. Memory 530 further stores code or instruction for directing processing unit 532 to obtain or receive sharing criteria metrics for each of the three phases from sensors 419 and to adjust loads on the single phase power converters based upon the received sharing criteria metrics.

Processing unit 532 follows instructions contained in memory 530. In one implementation, processing unit 532, following instructions contained in memory 530, compares sharing criteria metrics received from sensors 419 to stored thresholds when determining how to adjust loads on the single phase power converters. In another implementation, processing unit 532, following instructions contained in memory 530, compares sharing criteria metrics received from sensors 419 to one another as part of determining how to adjust loads on the single phase power converters. In one implementation, load adjustment control signals transmitted from controllers 120 to power converters 114A, 114B, 116A, 116B, 118A, 118B of systems 100 and 300 have a higher priority than load adjustment control signals transmitted to the same power converters from controller 520. In other words, system 400 is configured such that electrical current levels for each of the three phases are first adjusted to satisfy predefined electrical current objectives, such as enhanced balance, at the individual system 100, 300 level. For those individual systems 100, 300 having electrical current level across the three phases satisfying the predefined electrical current objectives at the individual power distribution unit level, loads of power converters 114A, 114B, 116A, 116B, 118A, 118B for those systems may be further adjusted based upon load adjustment control signals from controller 520 to further satisfy predefined electrical current objectives, such as enhanced electrical current balance, across the multiple systems 100, 300 and 500 at the transformer or uninterrupted power supply level.

Despite system 500 not having a controller 120 to adjust loads of power converters 114A, 114B, 116A, 116B, 118A, 118B to manage electrical current of the three electrical phases, controller 520 may still manage electrical current across the electrical phases supplying power to power distribution unit 102 of system 500. For example, in circumstances where electrical current across phase C as detected by sensors 419C at the transformer or uninterrupted power supply level exceeds a predetermined threshold, controller 520 may lower the electrical current across phase C being supplied to systems 100 and 300 by increasing the output voltages and corresponding loads for those power converters of systems 100 and 300 that are receiving power from the other phases, phases A and B, and that adjustable by controller 520. Similar adjustments may be made by controller 520 when electrical current across phase A or phase B are excessive or are otherwise not satisfying management objectives. In one implementation, system 400 alternatively comprises a single controller receiving sharing criteria metrics from both sensors 119 (shown in FIG. 3) and sensors at a higher level, sensors 419 (shown FIG. 6), wherein the single controller generates load adjustment control signals for those power converters that have loads that are adjustable by the single controller so as to satisfy three-phase management objectives, such as enhanced current balancing, at each of the multiple levels of system 400 (at the power distribution level and the higher or upstream transformer/UPS level).

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a controller to:
   receive a sharing criteria metric for each of three phases of a three-phase power; and
   generate control signals to adjust loads on single phase power converters receiving the three phase power based on the sharing criteria metric of each of the three phases.

2. The apparatus of claim 1, wherein the sharing criteria metric comprises a temperature.

3. The apparatus of claim 1, wherein the sharing criteria metric comprises electrical current.

4. The apparatus of claim 1, wherein the controller is to adjust loads on the single phase power converters to enhance a degree of electrical current balance across the three phases.

5. The apparatus of claim 4, wherein the single phase power converters have loads which are adjustable by the controller and wherein the controller is to adjust loads on the single phase power converters to enhance a degree of electrical current balance across the single phase power converters and at least one additional single phase power converter receiving the three-phase power but having a load which is not adjustable by the controller.

6. The apparatus of claim 1, wherein the sharing criteria metric is from outputs of a power distribution unit.

7. The apparatus of claim 1, wherein the sharing criteria metric is from outputs of a transformer.

8. The apparatus of claim 7, wherein the single phase power converters have loads which are adjustable by the controller and wherein the controller is to adjust loads on the single phase power converters to enhance a degree of electrical current balance across the single phase power converters and a power distribution unit receiving the three-phase power but having single phase power converters having loads which are not a adjustable by the controller.

9. The apparatus of claim 1, wherein at least two of the single phase power converters receive power from a same one of the three phases.

10. The apparatus of claim 1 further comprising at least four single phase power converters from which the controller receives the sharing criteria metric for each of three phases.

11. The apparatus of claim 1 further comprising a rack comprising:
    power consuming devices, each of the power consuming devices including the single phase power converters;
    a power distribution unit supplying the three phase power to the single phase power converters; and
    sensors to sense the sharing criteria metric for each of the three phases, wherein the controller receives the sharing criteria metric for each of the three phases from the sensors.

12. The apparatus of claim 11, wherein the sensors sense the sharing criteria metric at outputs of the power distribution unit.

13. The apparatus of claim 11 further comprising a transformer supplying the three-phase power to the power distribution unit, wherein the sensors sense the sharing criteria metric at outputs of the transformer.

14. An apparatus comprising:
    a non-transient computer-readable medium containing instructions to direct a processor to:
    receive a sharing criteria metric for each of three phases of a three-phase power; and
    adjust loads on single phase power converters receiving the three phase power based on the sharing criteria metric of each of the three phases.

15. A method comprising:
    receiving a sharing criteria metric for each of three phases of a three-phase power; and
    adjusting loads on single phase power converters receiving the three phase power based on the sharing criteria metric of each of the three phases.

\* \* \* \* \*